United States Patent
Armstead et al.

(10) Patent No.: US 7,324,922 B2
(45) Date of Patent: Jan. 29, 2008

(54) RUN-TIME PERFORMANCE VERIFICATION SYSTEM

(75) Inventors: Thomas M. Armstead, Rochester, MN (US); Lance R. Meyer, Rochester, MN (US); Paul E. Schardt, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/259,294

(22) Filed: Oct. 26, 2005

(65) Prior Publication Data

US 2007/0093986 A1 Apr. 26, 2007

(51) Int. Cl.
*G21C 17/00* (2006.01)

(52) U.S. Cl. .................................................. 702/186
(58) Field of Classification Search ................ 702/182
See application file for complete search history.

(56) References Cited

U.S. PATENT DOCUMENTS

| | | | |
|---|---|---|---|
| 6,278,959 B1* | 8/2001 | Alferness | 702/186 |
| 6,449,660 B1 | 9/2002 | Berg et al. | |
| 6,701,363 B1* | 3/2004 | Chiu et al. | 709/224 |
| 2003/0061006 A1* | 3/2003 | Richards et al. | 702/182 |
| 2004/0019457 A1* | 1/2004 | Arisha | 702/182 |
| 2004/0064293 A1* | 4/2004 | Hamilton et al. | 702/182 |
| 2004/0133395 A1* | 7/2004 | Ding et al. | 702/182 |
| 2006/0059568 A1* | 3/2006 | Smith-Mickelson et al. | 726/27 |

* cited by examiner

*Primary Examiner*—John Barlow
*Assistant Examiner*—Jonathan Moffat
(74) *Attorney, Agent, or Firm*—Patterson & Sheridan, LLP

(57) ABSTRACT

A method and apparatus that allow packet based communication transactions between devices over an interconnect bus to be captured to measure performance. Performance metrics may be determined by capturing events at various locations as they pass through the system. Performance may be verified at run time by computing performance metrics for captured events and comparing such metrics to predefined performance ranges and/or self learned performance ranges. Furthermore, embodiments of the present invention provide for dynamic tailoring of bus traffic to generate potential failing conditions. For some embodiments, performance verification as described herein may be performed in a simulation environment.

2 Claims, 3 Drawing Sheets

RUN-TIME PERFORMANCE VERIFICATION SYSTEM

BACKGROUND OF THE INVENTION

1. Field of the Invention

The present invention generally relates to exchanging packets of data on an interconnect bus connecting two devices, and more particularly, to measuring and verifying the performance of such an exchange.

2. Description of the Related Art

A system on a chip (SOC) generally includes one or more integrated processor cores, some type of embedded memory such as a cache shared between the processor cores, and peripheral interfaces such as an external bus interface, on a single chip to form a complete (or nearly complete) system. The external bus interface is often used to pass data in packets over an external bus between these systems and an external device such as an external memory controller, Input/Output (I/O) controller, or graphics processing unit (GPU).

The performance of such a system may depend on several factors which may include device characteristics, characteristics of interconnect buses, memory hierarchy, operating system, and various other factors. A reasonable prediction of ranges for system performance can still be made after considering such factors. However, it is generally desirable to verify that performance falls within these ranges during simulation. For example, it may be desirable to verify that the throughput (or bandwidth) and the latency (or response time) of communication over an interconnect bus between a transmitting and receiving device fall within their predicted range.

Conventionally, simulation involves running predefined test cases modeled to emulate normal system operation. During simulation, bus traffic is monitored, interesting events on the bus are captured, and performance is measured based on the captured events. The captured events and their performance metrics are recorded in a simulation log. It is only after simulation that a user can view all the bus events in the simulation log and identify categories of events that fall outside the predicted performance range. However, because the information contained in the simulation logs is rather cryptic, significant effort will be required to manually analyze, identify and parse those categories of events that do not fall within their performance range. Another problem with conventional simulation is that predefined test cases may not adequately test a given category of bus events. For example, a test case may not contain a sufficient number of read operations. As a result, the performance measurements for the read operation may not be statistically significant.

Yet another problem with the conventional testing method is that degradations in performance are unlikely to be detected, without tedious manual analysis, when the predicted range of performance is too lenient. For example, if the average latency associated with a particular transaction between two devices is predicted to be 1 second, but the measured average latency is only 0.2 seconds, then a degradation of the average latency from 0.2 seconds to 0.8 seconds is unlikely to be caught even though there is a significant, undesired change in performance.

Accordingly, what is needed is improved methods and apparatus for measuring and verifying performance of packet based data exchanges between devices connected by an interconnect bus.

SUMMARY OF THE INVENTION

Embodiments of the present invention generally provide methods, computer readable storage media, and systems for measuring and verifying performance of packet based communication transactions between devices over an interconnect bus.

One embodiment provides a method for determining performance characteristics of a system. The method generally includes executing a program to cause data to be exchanged between at least two devices of the system via a bus, capturing events indicative of data exchanged between the at least two devices by at least one interface monitor, calculating one or more performance metrics based on the captured events during execution of the program, storing the calculated performance metrics in a database, and determining whether the calculated performance metrics fall within a determined performance range.

Another embodiment provides a computer readable storage medium containing a program for determining performance characteristics of a system. When executed by a processor, the program performs operations generally including generating data to be exchanged between at least two devices of the system via a bus, capturing events indicative of data exchanged between the at least two devices by at least one interface monitor, calculating one or more performance metrics based on the captured events during execution of the program, storing the calculated performance metrics in a database, and determining whether the calculated performance metrics fall within a determined performance range.

Yet another embodiment provides a system generally including a first processing device, a second processing device coupled with the first processing device via a bus, at least one interface monitor for capturing events indicative of data exchanged between the at least two processing devices via the bus, and a performance monitor configured to calculate one or more performance metrics based on the captured events, store the one or more calculated performance metrics in a database, and determine whether the calculated performance metrics fall within a determined performance range.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention allow packet based communication transactions between devices over an interconnect bus to be captured to measure performance. Performance metrics may be determined by capturing events at various nodes as they pass through the system. Performance may be verified at run time by computing performance metrics for captured events and comparing such metrics to predefined performance ranges and/or self learned performance ranges. Furthermore, embodiments of the present invention provide for dynamic tailoring of bus traffic to generate potential failing conditions.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and not considered elements or limitations of the appended claims except where explicitly recited in the claim(s). Likewise, reference to "the invention" shall not be construed as a generalization of any inventive subject matter disclosed herein and shall not be considered to be an element or limitation of the appended claims except where explicitly recited in a claim(s).

An Exemplary Test System

Figure 1:
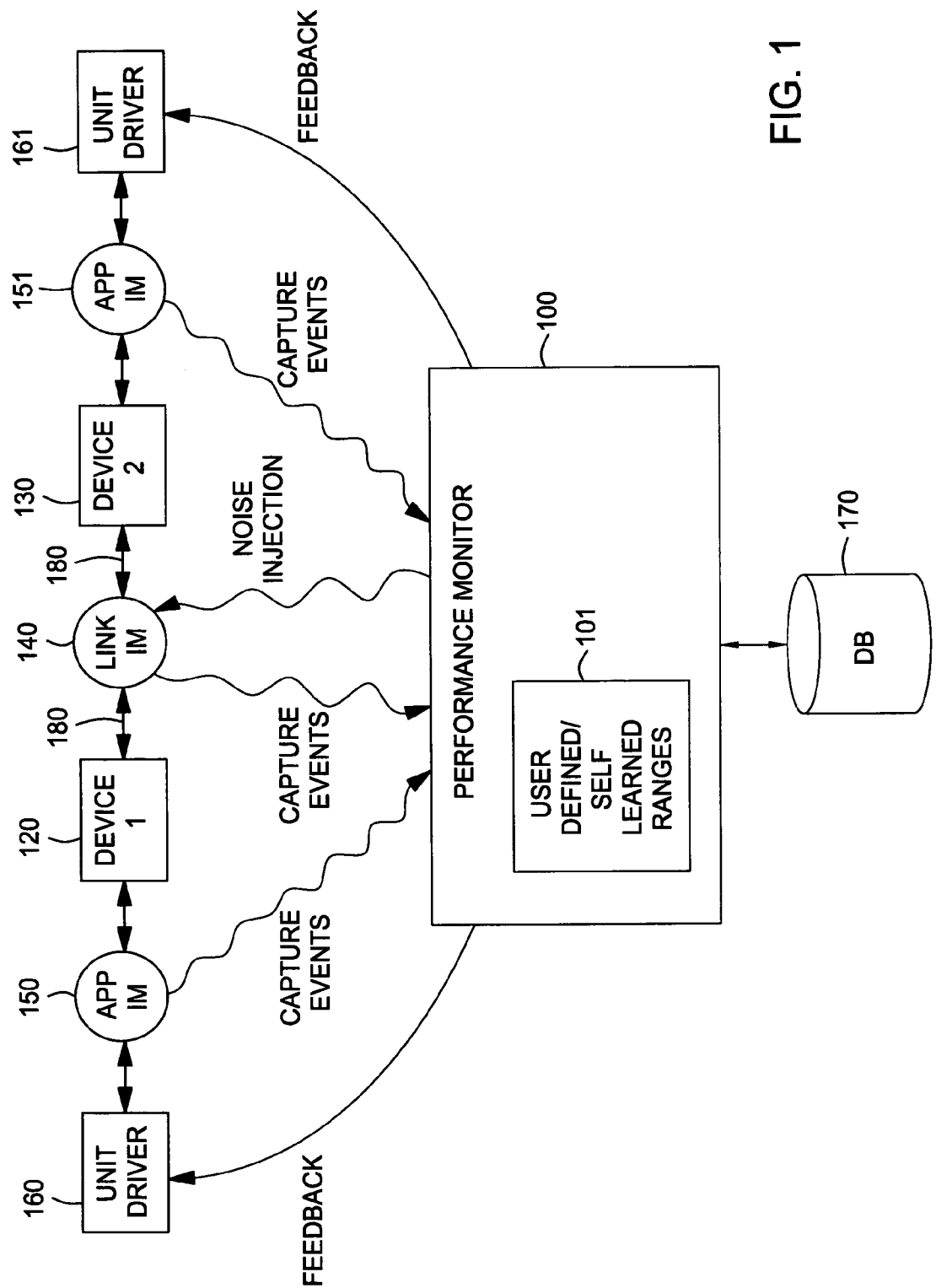
FIG. 1 illustrates an exemplary test environment in accordance with one embodiment of the present invention.

FIG. 1 illustrates an exemplary testing system in which a Performance Monitor 100 monitors performance between two devices (or nodes) 120 and 130 over an Interconnect Bus 180 (e.g., commonly referred to as a front side bus). The two devices 120 and 130, for example, may be a central processing unit (CPU) and a graphics processing unit (GPU). For some embodiments, the Bus 180 may be a bi-directional multi-bit bus, for example, having eight or more lines for communication from the CPU to the GPU and another eight or more lines for communication from the GPU to the CPU.

Communication between the devices 120 and 130 may be monitored by a Link Interface Monitor (IM) 140. Link IM 140 may be any combination of hardware and/or software configured to sample data lines of the Interconnect Bus 180 in conjunction with a clock signal. The Link IM may be further configured to examine the sampled data and recognize predefined categories of events. If a known event is captured, the Link IM may notify the performance monitor that the event is presented on the Interconnect Bus 180. For example, a CPU may perform a read operation on a specific location in the GPU by sending a read packet over an interconnect bus connecting the CPU and the GPU. The Link IM for the interconnect bus may capture the read packet when it is presented on the bus and notify the performance monitor that a read packet is found on the bus.

In some embodiments of the invention the Link IM may be configured to inject noise on to the Interconnect Bus 180. Such noise injection may be performed to simulate actual noise on the interconnect bus during normal operation of the system. In other embodiments, the Link IM may also be configured to introduce errors into an event captured on the bus before the event is dispatched to the destination device. For example, the Link IM may toggle some bits in the packet. As with noise injection, the introduction of errors may be performed to simulate actual errors that may occur while transferring packets during normal operation of the system. The goal of introducing such errors may be to verify that the destination device properly determines an error in the packet, for example by using a Cyclic Redundancy Check (CRC), and performs error correcting steps which may include correcting erroneous bits or requesting that the packet be sent again. While the above mentioned embodiments describe noise and error injection performed by the Link IM, those skilled in the art will recognize that such noise and error injection may be performed by a separate and independent device, such as an irritator device.

Each device 120 and 130 may be driven by Unit Drivers 160 and 161 respectively. Each Unit Driver may be software that is configured to cause an associated device to perform a series of functions, including sending packets to another device. For example, Unit Driver 160 may generate instructions to Device 120 to send a read packet to Device 130 over the Interconnect Bus 180. Such instructions by unit drivers 160 and 161 to devices 120 and 130 may be monitored by Application Interface Monitors (IM) 150 and 151 respectively. Each Application IM may be any combination of hardware and/or software configured to sample data lines connecting the Application IM and an associated device in conjunction with a clock signal. Furthermore, each Application IM may be configured to examine the sampled data and recognize predefined categories of instructions. As with the Link IM, if a known instruction is captured, the Application IM may notify the performance monitor that the event is presented to the associated device.

The events captured by the Link IM 140 and the Application IM's 150 and 151 may be received by a Performance Monitor 100 and stored in a shared Database 170. In some embodiments of the invention the Performance Monitor may store in the Database 170, a timestamp associated with each captured event. For example, the Performance may store in the database the simulation time at which each event was captured by the interface monitors.

The Performance Monitor 100 may be configured to calculate several performance metrics for the system based on the captured events. For example, to compute the latency of a read operation across Device 120, the Performance Monitor may subtract the timestamps for a read instruction issued by Unit Driver 160 and captured by Application IM 150, and an associated read packet captured by Link IM 140. Similarly, the Performance Monitor may also compute the latency of read responses between Device 1 and Device 2 over the Interconnect Bus 180 by subtracting the timestamps of a read packet and an associated data packet captured by Link IM 140. Several other similar performance metrics may be defined to measure latencies and throughput for the system.

The Performance Monitor may be further configured to store the calculated performance metrics in the shared Database 170. For example, the Performance Monitor may store the latencies of write and read operations in Database 170. A user may be allowed to query Database 170 to generate graphs that illustrate performance results for various bus events. Such graphs may allow a user to easily compare results between bus events in the same test run and/or different test runs.

The Performance Monitor 100 may be configured to fail a simulation test based on predefined or self learned performance ranges 101. The performance ranges 101 may define upper and lower range limits or an upper or lower threshold value. A predefined range may be defined by a user before running a test on the system. The predefined ranges may be chosen arbitrarily or according to ideal performance metrics calculated considering factors such as device characteristics, system architecture, system software, and the like. The self learned ranges, on the other hand, may be calculated based on historic system performance data contained in Database 170. For example, the self-learned ranges may be determined by computing an average of previously obtained performance metrics or by selecting values at or near the peak of a bell curve representing historic performance results. Any other reasonable method for calculating performance ranges may be used to determine expected performance based on historic performance.

Figure 2:
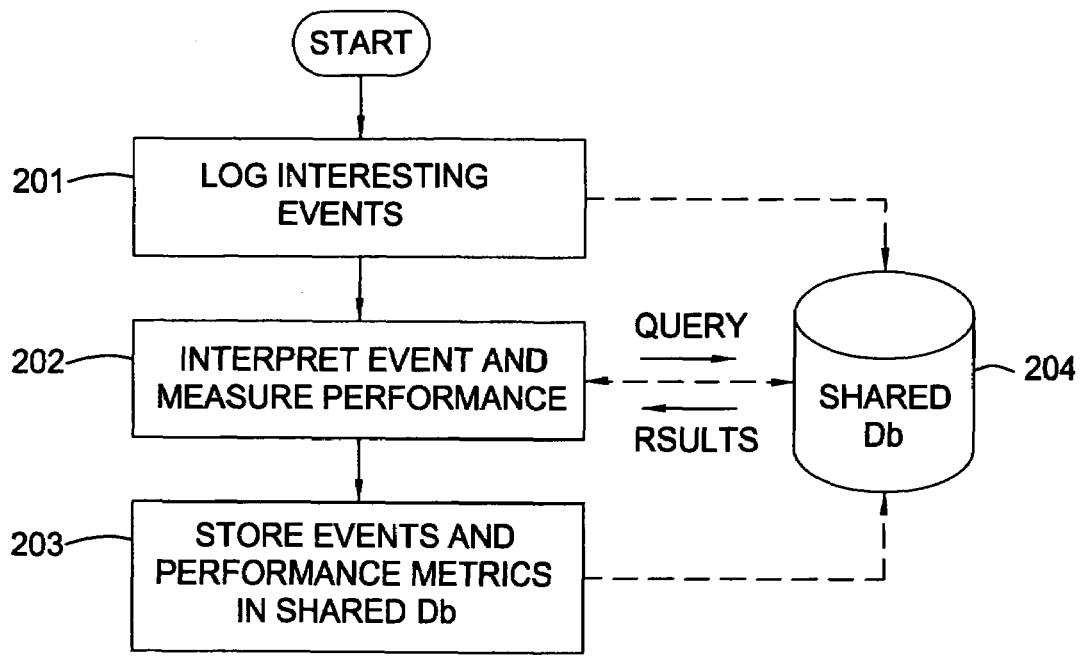
FIG. 2 is a flow diagram of exemplary operations for capturing bus events and calculating performance metrics for those events.

FIG. 2 is a flow diagram for exemplary operations performed to capture and store bus events in accordance with embodiments of the present invention. The operations may be performed, for example, by components illustrated in FIG. 1, while executing a specific program designed to emulate normal system operation (and produce typical bus traffic). However, those skilled in the art will recognize that the operations of FIG. 2 may be performed by other components and, further, that the components illustrated in FIG. 1 may be capable of performing other operations.

The operations begin, at step 201, by capturing events on the bus. As previously described, a Link IM or an Application IM may detect events indicating a transaction between devices or between a unit driver and an associated device, capture such an event, and send it to a Performance Monitor. In some embodiments of the invention the Link IM and Application IM may be a part of the Performance Monitor, therefore the events may be captured by the performance monitor directly. Captured events may be stored in a shared Database 204, as illustrated.

At step 202, the Performance Monitor may interpret the captured event and calculate Performance metrics for that event. This may require the Performance Monitor to query the database to find other events associated with the captured event. For example, when the Performance Monitor captures a read packet on the Interconnect Bus 180, it may query Database 170 for a read instruction issued from the Unit Driver 160 in order to calculate the latency of the read operation through Device 120. Several other performance metrics may also be computed at this time.

At step 203, the Performance Monitor may store the calculated performance metrics in the shared database. The performance metrics stored in the database may be used later to compute self learned ranges for system performance.

Figure 3:
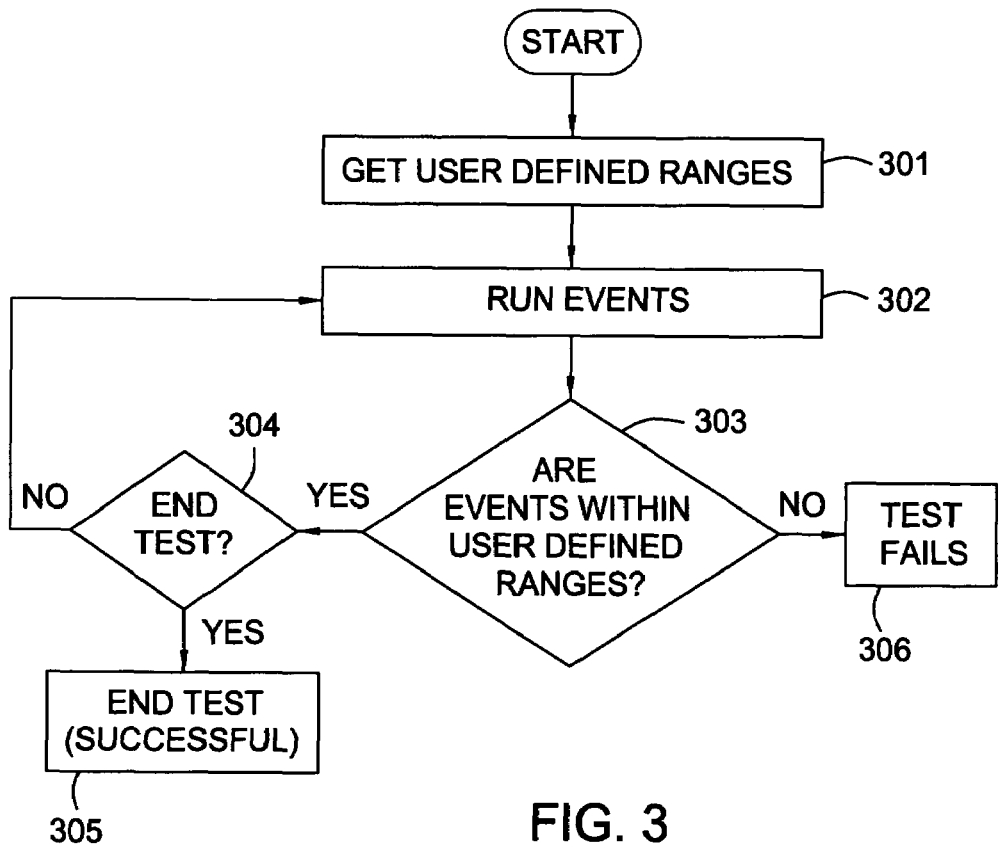
FIG. 3 is a flow diagram of exemplary operations for verifying that captured bus events fall within the predefined performance ranges.

FIG. 3 is a flow diagram for exemplary operations performed to verify, during run time, that performance of a system falls within predefined ranges. The operations begin at step 301 by getting the user defined ranges. At this step, the user may be prompted to define ranges for one or more performance metrics. Alternatively, the user may also be allowed to select predefined ranges used in previous simulations. Sets of predefined ranges may also be organized into test profiles. Each test profile may contain a unique combination of performance range settings. A user may be prompted to select one of these profiles at the outset of simulation. In one embodiment of the invention, the predefined ranges may be selected for a plurality of simulation tests to facilitate batch testing with the same predefined parameters.

At step 302, simulation begins by Unit Drivers generating stimulus to the devices in order to emulate normal system operation and produce typical bus traffic. As simulation continues, the Performance Monitor performs the steps outlined in FIG. 2 to capture events and measure performance. In some embodiments of the invention, the Performance Monitor may compute performance results only after the simulation is run for a predetermined period of time. As each event is captured and performance metrics calculated, the test in step 303 is performed to determine whether the performance metrics calculated fall within the predefined ranges. If a calculated performance metric for a captured event falls outside of its predefined range, simulation may be stopped and a system failure message may be generated at step 306. In some embodiments of the invention, simulation may be stopped only if a certain threshold number of events fall outside the predefined range. Stopping simulation on the occurrence of a failing condition may save valuable simulation time and make performance verification more efficient.

If, on the other hand, the performance metric is deemed to fall within the predefined range, the Performance Monitor continues to capture and calculate performance metrics for events until another performance metric falls outside the predefined range or an end-of-test is detected in step 304. If an end-of-test is detected and all performance metrics fall within the predefined ranges, then the simulation run is deemed successful at step 305.

Figure 4:
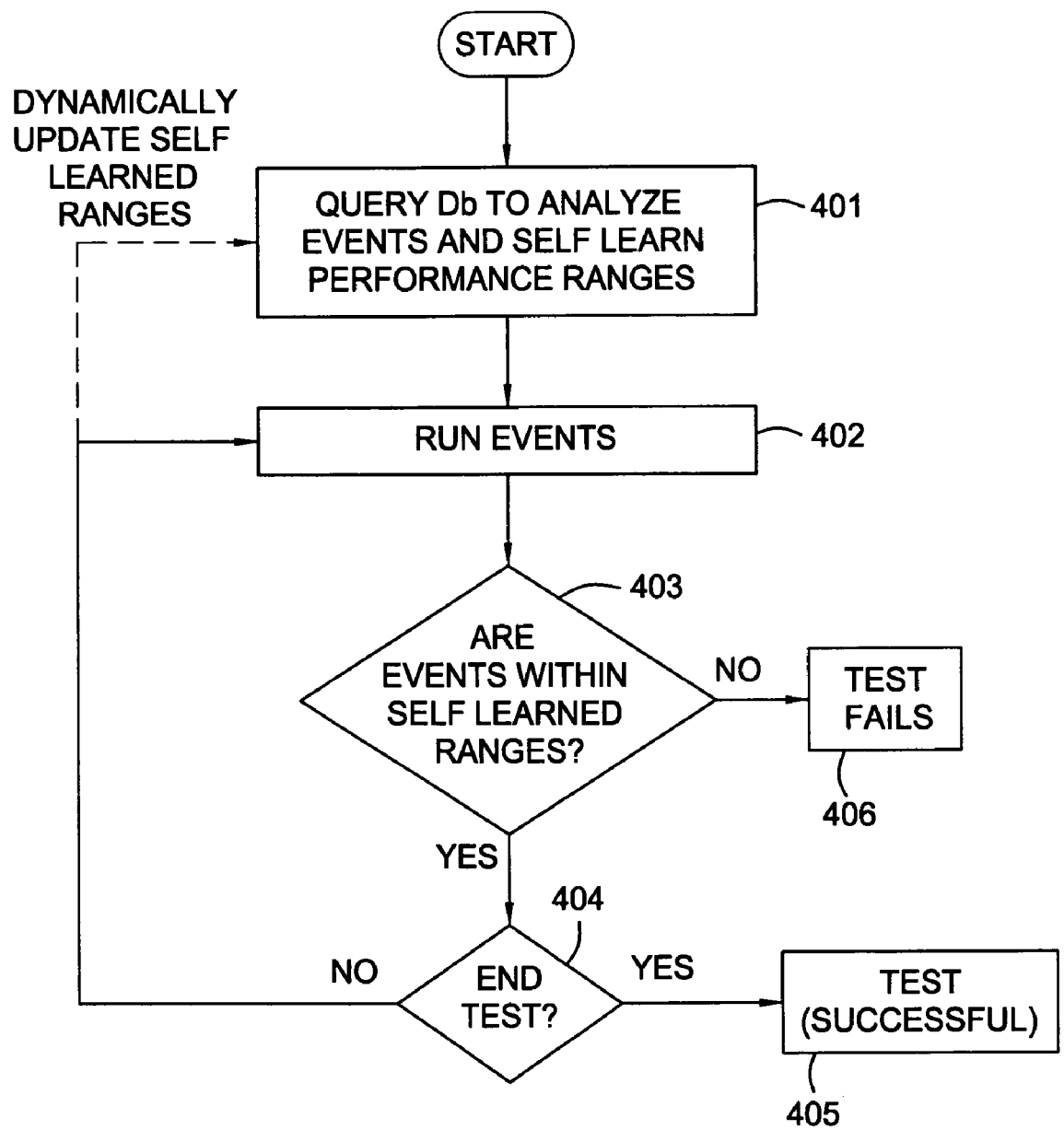
FIG. 4 is a flow diagram of operations performed for verifying that captured events fall within the self learned performance ranges.

FIG. 4 is a flow diagram for exemplary operations performed to verify, during run time, that performance of a system falls within ranges determined by the system (self learned ranges). The operations begin in step 401 by determining the ranges that will be used to verify performance metrics. The ranges may be determined by querying the Database 170 for performance metrics stored from previously run simulations and computing the self learned ranges based on such historic data. As discussed earlier, any method such as computing averages and normal curve peaks may be used to determine an expected performance range based on historic data.

In step 402, the simulation may begin once the self learned performance ranges are determined. As in the description for FIG. 3, the Performance Monitor may monitor and calculate the performance metrics for events as they are captured during run time. These calculated performance metrics may be stored for later calculations of self learned ranges. In some embodiments of the invention, however, the Performance monitor may use the calculated performance metric for a captured event to dynamically update the self learned ranges being applied in the current simulation.

In step 403, if a calculated performance metric for a captured event falls outside of the self learned range, simulation may be stopped and a system failure message may be generated at step 406. In some embodiments of the invention, simulation may be stopped only if a certain threshold number of events fall outside the self learned range. If, on the other hand, the performance metric is deemed to fall within the predefined range, the Performance Monitor continues to capture and calculate performance metrics for events until another performance falls outside the self learned range or an end-of-test is detected in step 404. If an end-of-test is detected and all performance metrics fall within the predefined ranges, then the simulation run is deemed successful at step 405.

In some embodiments of the invention, the user may be allowed to configure the Performance Monitor to compare the performance metrics for a captured event with predefined ranges, self learned ranges, or both the predefined ranges and self learned ranges. For example, a user may choose to run simulation according to user defined ranges when the Database 170 does not contain sufficient information to calculate statistically significant self learned ranges. On the other hand, a user may run simulation according to the self learned ranges in order to detect any drastic changes in performance when the predefined ranges are suspected to be too lenient. Alternatively, a user may elect to run simulation according to both the predefined and self learned ranges to obtain the benefits of both approaches to verifying performance.

Dynamic Command Weighting

One common problem with using predefined test cases to generate traffic during simulation is that a problem causing event may not be adequately tested by the test case. For example, a test case may have only a few read operations which may be insufficient to bring about a failing condition. Therefore, another test case must be written that has sufficient read operations. However, under this approach an innumerable number of test cases will have to be written to account for all the various permutations and combinations of failing conditions.

The present invention provides for dynamically tailoring the events generated by the Unit Drivers by weighting commands based on run time results. For example, if a write operation latency is deemed to be approaching a failing condition, a weight parameter associated with the write operation may be dynamically adjusted so that the write operation is generated more frequently. One method for determining whether a performance metric is approaching a failing condition may be to determine if the performance metric falls outside a threshold range within the predefined range and/or self-learned range.

Referring back to FIG. 1, the Performance Monitor 100 may contain the necessary logic to compute weights for different categories of events based on run time results and provide feedback to the Unit Drivers 160 and 161. In response to this feedback, the Unit Drivers may dispatch instructions to reflect the dynamically adjusted weights for the instructions.

CONCLUSION

By monitoring key performance metrics real time during simulation, then using that information along with predefined and/or self learned performance ranges and dynamic command weighting based on real time results to fail the simulation, the present invention may notify a user that there is a potential problem, and identify the offending event. As a result, a more efficient and effective verification of system performance may be achieved.

While the foregoing is directed to embodiments of the present invention, other and further embodiments of the invention may be devised without departing from the basic scope thereof, and the scope thereof is determined by the claims that follow.

What is claimed is:

1. A method for determining bus performance characteristics of a system bus, comprising, during execution of a program which generates data exchanges:
    (a) measuring bus performance of the system bus, comprising:
        (i) capturing events indicative of the data exchanges by at least one interface monitor between at least two devices of the system via a system bus of the system;
        (ii) interpreting the captured events and calculating performance metrics for those captured events;
        (iii) storing the calculated performance metrics in a database; and
    (b) verifying bus performance of the system bus, comprising:
        (i) determining whether the calculated performance metrics fall within a determined performance range, wherein the determined performance range comprises at least a self-learned performance range; wherein the self-learned performance range is generated by:
            (1) querying the database to receive a sample of previously stored performance metrics, wherein the sample of previously stored performance metrics comprises at least some performance metrics stored prior to the execution of the program and during the execution of the program; and
            (2) calculating the self-learned performance range based on values of the sample;
    (c) in response to the determining, varying a rate at which one or more events occur on the bus during the execution of the program, resulting in the generation of potential events which fall outside the predetermined performance range and the generation of those events more frequently.

2. The method of claim 1, wherein whether to vary the rate is determined by querying the database.

* * * * *